US011026020B2

(12) United States Patent
Park et al.

(10) Patent No.: US 11,026,020 B2
(45) Date of Patent: Jun. 1, 2021

(54) ELECTRONIC DEVICE FOR FORCING LIQUID OUT OF SPACE IN HOUSING TO THE OUTSIDE USING VIBRATION PLATE INCLUDED IN SPEAKER AND CONTROL METHOD THEREOF

(71) Applicant: SAMSUNG ELECTRONICS CO., LTD., Suwon-si (KR)

(72) Inventors: Youngbae Park, Suwon-si (KR); Changshik Yoon, Suwon-si (KR); Hongki Kim, Suwon-si (KR); Junhui Lee, Suwon-si (KR); Dongheon Jang, Suwon-si (KR); Sohae Kim, Suwon-si (KR); Hyunjong Roh, Suwon-si (KR); Limsam Lim, Suwon-si (KR); Hochul Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 29 days.

(21) Appl. No.: 16/520,676

(22) Filed: Jul. 24, 2019

(65) Prior Publication Data
US 2020/0037069 A1 Jan. 30, 2020

(30) Foreign Application Priority Data
Jul. 30, 2018 (KR) .................. 10-2018-0088789

(51) Int. Cl.
*H04R 3/00* (2006.01)
*H04R 1/02* (2006.01)
*H04R 9/06* (2006.01)
*H04R 29/00* (2006.01)
*G06F 3/16* (2006.01)

(52) U.S. Cl.
CPC ............. *H04R 3/007* (2013.01); *G06F 3/165* (2013.01); *H04R 1/025* (2013.01); *H04R 9/06* (2013.01); *H04R 29/001* (2013.01); *H04R 2499/11* (2013.01)

(58) Field of Classification Search
CPC .......... H04R 3/007; H04R 1/025; H04R 9/06; H04R 29/001; H04R 2499/11
See application file for complete search history.

(56) References Cited

U.S. PATENT DOCUMENTS

| 10,601,970 | B2 * | 3/2020 | Gilmore | H04R 1/086 |
| 2007/0047747 | A1 * | 3/2007 | Yoshida | H04R 3/007 |
| | | | | 381/189 |
| 2015/0163572 | A1 * | 6/2015 | Weiss | H04R 1/2876 |
| | | | | 381/337 |

(Continued)

*Primary Examiner* — David L Ton
(74) *Attorney, Agent, or Firm* — Nixon & Vanderhye P.C.

(57) ABSTRACT

An electronic device includes a memory, a housing, an acoustic module comprising a coil and an acoustic membrane configured to be movable based on a signal applied to the coil, the acoustic module being disposed in an internal space of the housing, an amplifier, and a processor. The memory may store instructions that when executed by the processor cause the processor to apply a first signal to the coil through the amplifier to move the acoustic membrane in a first direction by a first distance and applying a second signal to the coil through the amplifier to move the acoustic membrane in a second direction different from the first direction and/or to move the acoustic membrane by a second distance different from the first distance after applying the first signal to the coil.

28 Claims, 11 Drawing Sheets

(56) References Cited

U.S. PATENT DOCUMENTS

| | | | |
|---|---|---|---|
| 2016/0241945 A1* | 8/2016 | Zadesky | H04R 29/00 |
| 2017/0041712 A1* | 2/2017 | Lippert | H04R 1/44 |
| 2018/0058918 A1* | 3/2018 | Vitt | G01N 29/028 |
| 2018/0084324 A1* | 3/2018 | Vitt | H04R 9/025 |
| 2018/0227668 A1* | 8/2018 | Park | H04R 1/42 |
| 2019/0025133 A1* | 1/2019 | Lee | G01K 1/16 |

\* cited by examiner

ELECTRONIC DEVICE FOR FORCING LIQUID OUT OF SPACE IN HOUSING TO THE OUTSIDE USING VIBRATION PLATE INCLUDED IN SPEAKER AND CONTROL METHOD THEREOF

CROSS-REFERENCE TO RELATED APPLICATION

This application is based on and claims priority under 35 U.S.C. § 119 to Korean Patent Application No. 10-2018-0088789, filed on Jul. 30, 2018, in the Korean Intellectual Property Office, the disclosure of which is incorporated by reference herein its entirety.

BACKGROUND

1. Field

The disclosure relates to controlling a speaker included in an electronic device.

2. Description of Related Art

With the development of information technology (IT), various types of electronic devices such as smartphones and tablet personal computers (PCs) have come into wide use. The electronic device may provide various functions, for example, a call function, a music output function, an image capture function, and an Internet access function. The electronic device may include various components for providing the various functions.

The electronic device may include a speaker for outputting a sound included in content or the like to the outside. The electronic device may include one speaker, or may include a plurality of speakers for providing sounds of various functions or formats. For example, the electronic device may include a separate speaker for performing a specific function (e.g., the call function) or may include the plurality of speakers for establishing a plurality of channels (e.g., 2.1 channels).

A configuration in an electronic device may be exposed to the outside through a hole formed in a housing to perform a specified function. Thus, liquid may be introduced into the electronic device through the hole formed in the housing. The electronic device may fail to operate normally by the liquid introduced into the electronic device. Particularly, when liquid is introduced into a duct of a speaker through a speaker hole formed in the housing, the electronic device may output a sound of volume less than set volume. The electronic device may move its vibration plate to remove liquid in the duct of the speaker. However, due to the nature of the duct through which an acoustic signal passes, it may be difficult to efficiently remove the liquid using only repeated movement of the vibration plate.

The above information is presented as background information only to assist with an understanding of the present disclosure. No determination has been made, and no assertion is made, as to whether any of the above might be applicable as prior art with regard to the present disclosure.

SUMMARY

Embodiments of the disclosure address at least the above-mentioned problems and/or disadvantages and to provide at least the advantages described below. Accordingly, an aspect of the disclosure is to provide an electronic device which provides a method for controlling a vibration plate to efficiently force out liquid introduced into a duct of a speaker.

In accordance with an aspect of the disclosure, an electronic device is provided. An electronic device may include a memory, a housing, an acoustic module disposed in an internal space of the housing and the acoustic module comprising a coil and an acoustic membrane, the acoustic membrane being movable based on a signal applied to the coil, an amplifier electrically connected with the acoustic module, and a processor configured to control the acoustic module. Instructions stored in the memory, when executed by the processor, may cause the processor to apply a first signal to the coil via the amplifier to move the acoustic membrane in a first direction by a first distance to force out at least a portion of liquid introduced into at least a portion of the internal space to the outside of the internal space using the acoustic membrane and to apply a second signal to the coil via the amplifier to move the acoustic membrane in a second direction different from the first direction and/or to move the acoustic membrane by a second distance different from the first distance after applying the first signal to the coil.

In accordance with another aspect of the disclosure, a method of controlling an electronic device to force out liquid in an acoustic cavity in the electronic device including an acoustic module comprising a coil and an acoustic membrane and a housing, in which the acoustic module is disposed, is provided. The method may include applying a first signal to the coil via an amplifier to move the acoustic membrane in a first direction by a first distance and applying a second signal to the coil via the amplifier to move the acoustic membrane in a second direction different from the first direction and/or to move the acoustic membrane by a second distance different from the first distance after applying the first signal to the coil.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Hereinafter, various example embodiments of the disclosure may be described with reference to accompanying drawings. Accordingly, those of ordinary skill in the art will recognize that modifications, equivalents, and/or alternatives of the various embodiments described herein can be variously made without departing from the scope and spirit of the disclosure.

Figure 1:
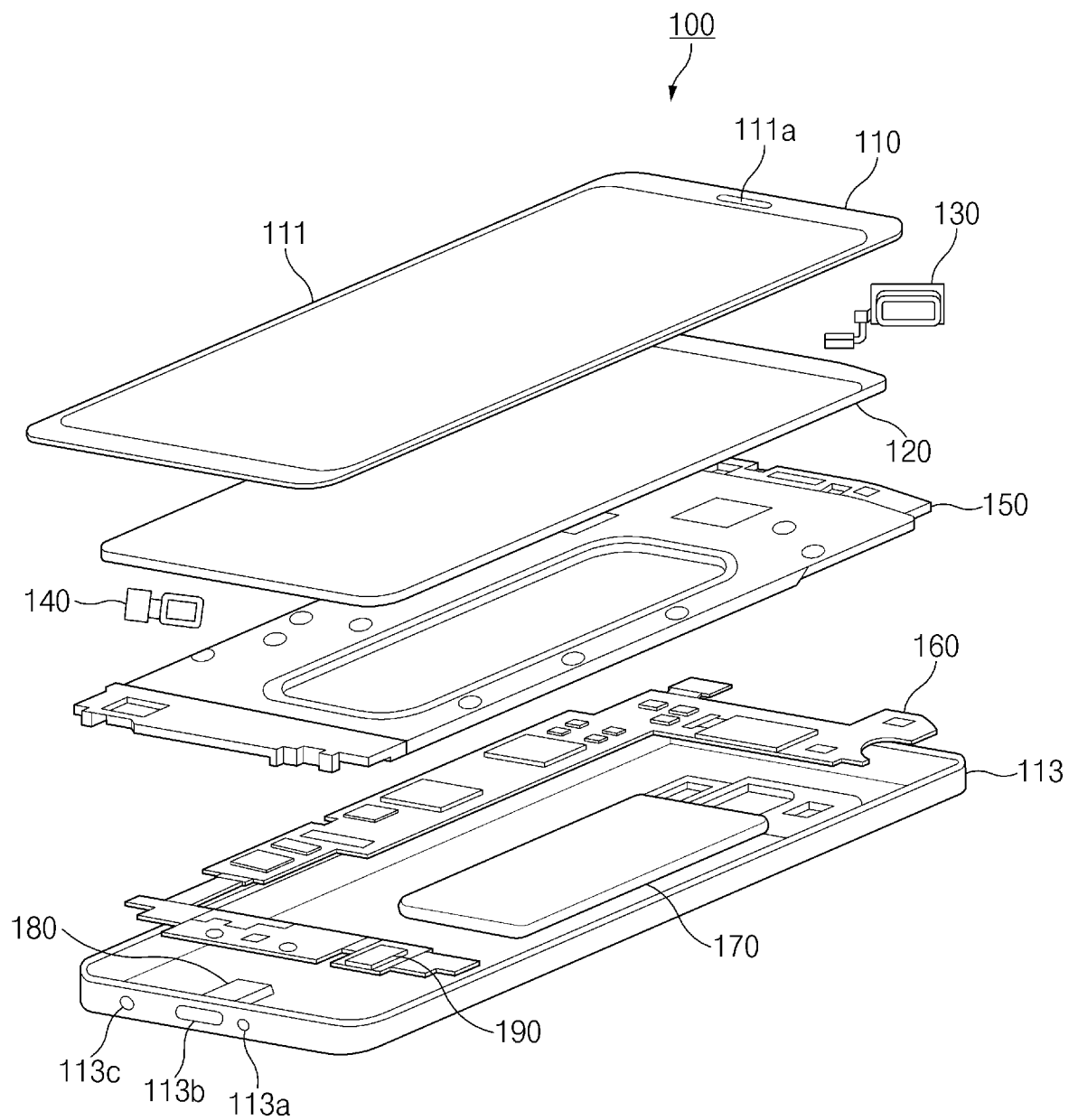
FIG. 1 is an exploded perspective view illustrating an example configuration of an electronic device according to various embodiments.

FIG. 1 is an exploded perspective view illustrating an example configuration of an electronic device according to various embodiments.

Referring to FIG. 1, an electronic device 100 may include a housing 110, a display 120, a speaker (or an acoustic module) 130, a microphone 140, a bracket 150, a printed circuit board (PCB) 160, a battery 170, a communication port 180, and an acoustic port 190. According to an embodiment, the electronic device 100 may not include some of the components of FIG. 1 or may further include another component which is not shown. Furthermore, an order where the components included in the electronic device 100 are laminated may differ from a laminated order shown in FIG. 1.

According to an embodiment, the electronic device 100 may be implemented as one of various devices for outputting at least one of an image or a sound, such as, for example, and without limitation, a television (TV), a desktop, a notebook personal computer (PC), a smartphone, a tablet PC, a monitor, a digital photo frame, a wearable device, or the like.

According to an embodiment, the housing 110 may define the appearance of the electronic device 100 and may protect a part disposed in the electronic device 100 from an external environment (e.g., moisture, impact, or the like). According to an embodiment, the housing 110 may include a front cover 111 and a rear cover 113. The front cover 111 may form a front portion of the electronic device 100. Furthermore, the rear cover 113 may form a side portion and a rear portion of the electronic device 100.

According to an embodiment, the front cover 111 may include a glass window. The glass window may transmit light generated by the display 120. According to an embodiment, the front cover 111 may include a speaker hole 111*a*. The speaker hole 111*a* may be formed in, for example, an upper portion of the front cover 111. According to an embodiment, fluid (e.g., air) inside and outside the electronic device 100 may flow out and in the electronic device 100 via the speaker hole 111*a*. According to various embodiments, the speaker hole 111*a* may include a plurality of speaker holes depending on the number of the speakers 130 installed in the electronic device 100. Furthermore, the speaker hole 111*a* may be formed in the rear cover 113 as well as the front cover 111. According to an embodiment, a user may make contact with the front cover 110 using his or her body's part (e.g., his or her finger) or an electronic pen to perform a touch on the front cover 111. According to an embodiment, the front cover 111 may, for example, and without limitation, be formed of tempered glass, reinforced plastic, flexible polymer materials, or the like.

According to an embodiment, the rear cover 113 may include a microphone hole 113*a* and a plurality of ports 113*b* and 113*c*. In other words, the microphone hole 113*a* and the plurality of ports 113*b* and 113*c* may be formed in a portion of the side of the electronic device 100. According to an embodiment, fluid inside and outside the electronic device 100 may flow out and in the electronic device 100 via the microphone hole 113*a*. According to various embodiments, the microphone hole 113*a* may include a plurality of microphone holes depending on the number of the microphones 140 installed in the electronic device 100. Furthermore, the microphone hole 113*a* may be formed in the front cover 111 as well as the rear cover 113. According to an embodiment, the rear cover 113 may be formed of a metal material (or a conductive material).

According to an embodiment, the display 120 may be disposed between the front cover 111 and the bracket 150. According to an embodiment, the display 120 may be exposed via a front portion of the housing 110. For example, the display 120 may be exposed through the glass window of the front cover 111. According to an embodiment, the display 120 may display an image (or a video image). The display 120 may be electrically connected with the PCB 160 to receive a signal associated with the image. According to an embodiment, the display 120 may be a touch screen display. For example, the display 120 may further include a touch panel for receiving a touch input of the user.

According to an embodiment, the speaker 130 may be located in the housing 110. Furthermore, the speaker 130 may be disposed in a location corresponding to the speaker hole 111*a*. According to an embodiment, the speaker 130 may output a sound. For example, the speaker 130 may output a sound corresponding to an image displayed on the display 120. The speaker 130 may be electrically connected with the PCB 160 to receive a signal associated with the sound. According to an embodiment, the speaker 130 may output a generated acoustic signal through the speaker hole 111*a*. A description of the structure of the speaker 130 will be provided in greater detail below with reference to FIG. 3.

According to various embodiments, the electronic device 100 may include a plurality of speakers. For example, the electronic device 100 may include a front speaker (e.g., a receiver) for performing a call function and a rear or side speaker for outputting a sound of content. When the electronic device 100 includes the rear or side speaker, a speaker hole may be formed in a rear or side surface of the housing 110.

According to an embodiment, the microphone 140 may be disposed in the housing 110. Furthermore, the microphone 140 may be disposed in a location corresponding to the microphone hole 113*a*. According to an embodiment, the microphone 140 may detect a sound wave generated outside the electronic device 100 and may generate an electrical signal corresponding to the detected sound wave. The microphone 140 may deliver the generated electrical signal to a processor of the PCB 160. According to an embodiment, the microphone 140 may receive an acoustic signal, introduced from the outside of the electronic device 100, through the microphone hole 113*a*. According to an embodiment, the electronic device 100 may receive a user utterance (or a voice signal) via the microphone 140.

According to an embodiment, the electronic device 100 may include a plurality of microphones. When the electronic device 100 includes the plurality of microphones, it may accurately determine a direction, a distance, or the like of a sound source. When the electronic device 100 includes the plurality of microphones, a plurality of speaker holes may be formed in the housing 110.

According to an embodiment, the bracket 150 may be located between the front cover 111 and the rear cover 113. According to an embodiment, the bracket 150 may fit a configuration in the housing 110 into a specified position. The display 120, the speaker 130, and the microphone 140 may be fitted into an upper end of the bracket 150. Furthermore, the PCB 160 may be fitted into a lower end of the bracket 150. According to an embodiment, the bracket 150 may include at least one through-hole for electrically connecting the components located in the upper and lower ends. According to an embodiment, the bracket 150 may be formed of an insulating material.

According to an embodiment, the PCB 160 may be located between the bracket 150 and the rear cover 113. According to an embodiment, the PCB 160 may include a plurality of elements for an operation of the electronic device 100. The plurality of elements may be mounted on the PCB 160, and the plurality of mounted elements may be electrically connected with each other via a printed circuit. The plurality of elements may include, for example, and without limitation, an application processor (AP), a communication processor (CP), a display driver integrated circuit (IC) (DDI), a wireless communication circuitry (or a wireless communication module), an amplifier (AMP), or the like. According to an embodiment, the PCB 160 may include a plurality of layers. The plurality of layers may include, for example, and without limitation, a ground layer (or a ground plane). The ground layer may, for example, be formed of a conductive material.

According to an embodiment, the battery 170 may be located between the display 120 and the rear cover 113. According to an embodiment, the battery 170 may supply electrical energy to the display 120, the speaker 130, and the PCB 160. According to an embodiment, the battery 170 may convert electrical energy supplied from the outside into chemical energy and may store the chemical energy. In other words, the battery 170 may be a chargeable secondary cell. According to an embodiment, a charge and discharge state of the battery 170 may be managed by a battery management module (or a battery management system (BMS)).

According to an embodiment, the communication port 180 may be located between the front cover 111 and the rear cover 113. Furthermore, the communication port 180 may be disposed in a position corresponding to the first port hole 113*b*. According to an embodiment, the communication port 180 may be exposed to the outside of the electronic device 100 through the first port hole 113*b*. According to an embodiment, as a jack of a specified form is inserted into the communication port 180, the communication port 180 may be connected with an external electronic device (e.g., a PC). The specified form may be, for example, and without limitation, a type such as 5 pins, 11 pins, 30 pins, or the like.

According to an embodiment, the acoustic port 190 may be located between the front cover 111 and the rear cover 113. Moreover, the acoustic port 190 may be disposed in a position corresponding to the second port hole 113*c*. According to an embodiment, the acoustic port 190 may be exposed to the outside of the electronic device 100 through the second port hole 113*c*. According to an embodiment, as an earphone jack (or a phone plug jack) is inserted into the acoustic port 190, the acoustic port 190 may be connected with an earphone (not shown).

Figure 2:
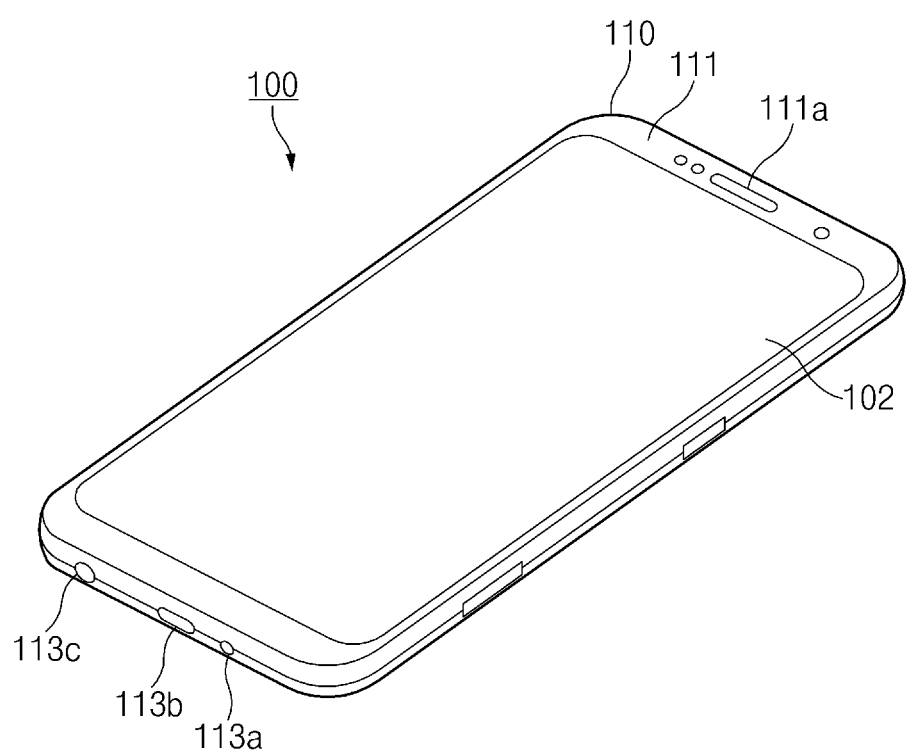
FIG. 2 is a front perspective view of an example electronic device according to various embodiments.

FIG. 2 is a front perspective view of an example electronic device according to various embodiments.

Referring to FIG. 2, in a state where components of an electronic device 100 are combined with each other, a configuration in a housing 110 may be covered not to be exposed to the outside. Furthermore, the configuration in the housing 110 may be exposed to the outside of the electronic device 100 through a hole formed in the housing 100 if necessary.

According to an embodiment, a speaker (e.g., a speaker 130 of FIG. 1) may be exposed to the outside of the electronic device 100 through a speaker hole 111*a* formed in a front cover 111 of the housing 110. For example, the speaker may be connected to the speaker hole 111*a* to be exposed to the outside of the electronic device 100. According to an embodiment, the speaker may output a generated acoustic signal through the speaker hole 111*a*. For example, the speaker may emit the generated acoustic signal through the speaker hole 111*a*. A description of the operation of outputting the acoustic signal of the speaker will be provided in greater detail below.

According to an embodiment, a microphone (e.g., a microphone 140 of FIG. 1) may be exposed to the outside of the electronic device 100 through a microphone hole 113*a* formed in a portion constituting a side of the electronic device 100 in a rear cover 113 of the housing 110. For example, the microphone may be connected to the microphone 113*a* to be exposed to the outside of the electronic device 100. According to an embodiment, the microphone may receive an acoustic signal from the outside of the electronic device 100 through the microphone hole 113*a*. For example, the microphone may introduce an acoustic signal from the outside of the electronic device 100 through the microphone hole 113*a*.

According to an embodiment, a communication port (e.g., a communication port 180 of FIG. 1) and an acoustic port (e.g., an acoustic port 190 of FIG. 1) may be exposed to the outside through the port holes 113*b* and 113*c* formed in a portion of the side of the electronic device 100 in the rear cover 113 of the housing 110.

Figure 3:
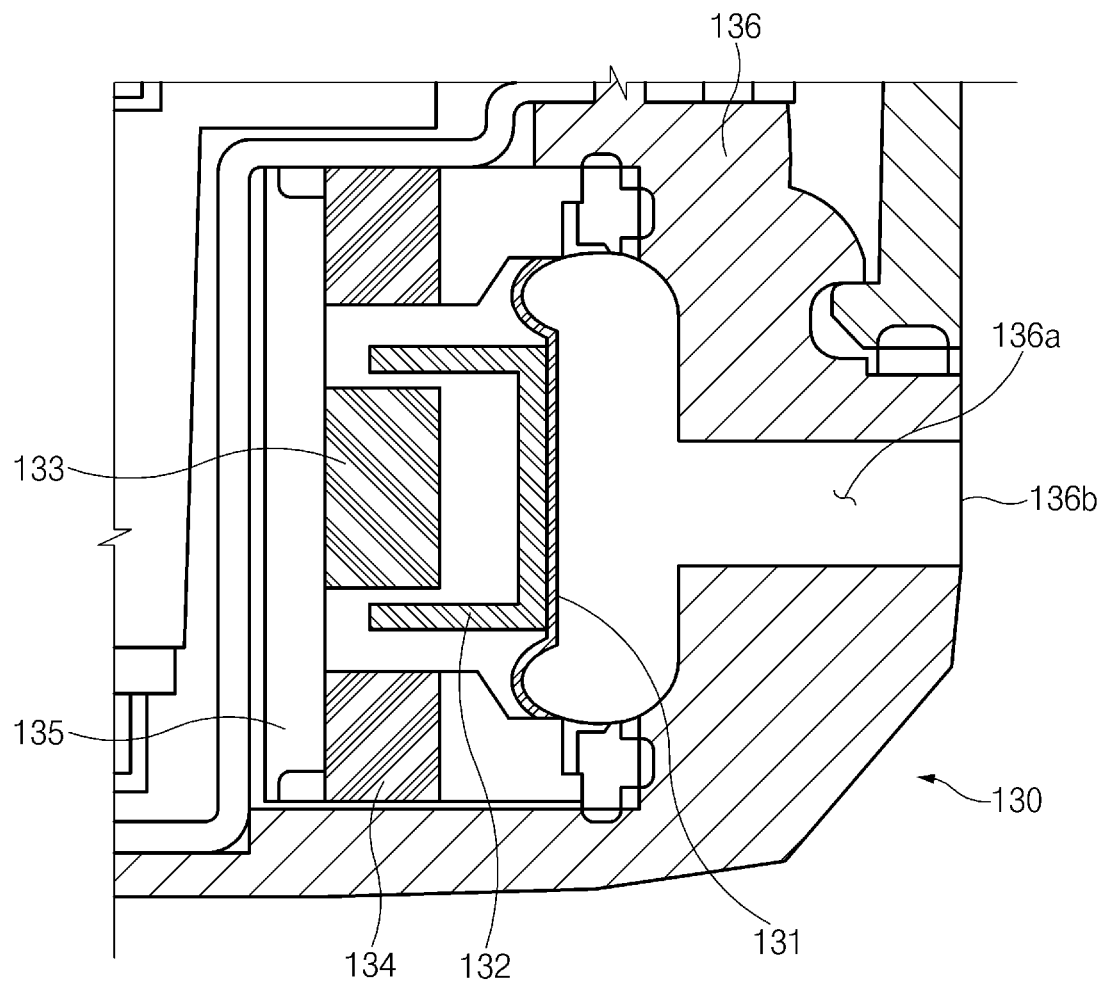
FIG. 3 is a cross-sectional view illustrating an example electronic device including a speaker according to various embodiments.

FIG. 3 is a cross-sectional view illustrating an example electronic device including a speaker according to various embodiments.

Referring to FIG. 3, a speaker 130 may include a mechanism 136 in which a vibration plate (or an acoustic membrane) 131, a voice coil 132, a central magnet 133, a side magnet 134, a yoke 135, a duct (or an acoustic cavity) 136*a* are formed.

According to an embodiment, the vibration plate 131 may move by the voice coil 132, the central magnet 133, the side magnet 134, and the yoke 135. According to an embodiment, the voice coil 132 may be combined with the vibration plate 131. At least a part of the voice coil 132 may be located between the central magnet 133 and the side magnet 134. For example, both ends of the voice coil 132 may be located between the central magnet 133 and the side magnet 134. According to an embodiment, when current (or voltage) is applied to the voice coil 132, a location of the voice coil 132 may change according to a level of the applied current (or voltage). In other words, a relative location of the voice coil 132 may change according to a level of the applied current. According to an embodiment, when a signal is applied to the voice coil 132, movement of the voice coil 132 may occur based on the applied signal. The signal may have a current level changed over time. Thus, as the relative location of the voice coil 132 changes according to the signal, movement of the voice coil 132 may occur. Thus, movement of the vibration plate 131 combined with the voice coil 132 may occur.

According to an embodiment, an acoustic signal may be generated by the movement of the vibration plate 131. For example, vibration of air (or a sound wave) may be generated by the movement of the vibration plate 131 to generate an acoustic signal. The acoustic signal may be a signal within an audible frequency range (about 20 to 20,000 Hz).

According to an embodiment, the acoustic signal generated by the vibration plate 131 may be emitted to a radiation hole 136b through the duct 136a of the mechanism 136. According to an embodiment, the duct 136a and the radiation hole 136b of the mechanism 136 may be connected to a speaker hole (e.g., a speaker hole 111a of FIG. 1) formed in a housing (e.g., a housing 110 of FIG. 1). Thus, the acoustic signal generated by the vibration plate 131 may be output to the outside through the duct 136a and the radiation hole 136b formed in the mechanism 136 and the speaker hole formed in the housing. According to an embodiment, the mechanism 136 may be formed in the housing (e.g., the housing 110 of FIG. 1) of the electronic device 100 or may be a separate housing of the speaker 130 itself, independent of the housing of the electronic device 100. The housing of the speaker 130 itself may be, for example, a housing for forming an internal structure of the speaker 130.

Liquid may be introduced into the electronic device through a hole formed in the housing of the electronic device. The electronic device may fail to operate normally due to the introduced liquid. For example, when liquid is introduced into the duct 136a of the speaker 130 through the speaker hole (e.g., a speaker hole 111a of FIG. 2) formed in the housing, the electronic device may output a sound with volume less than set volume. The electronic device may move the vibration plate 131 to remove liquid in the duct 136a of the speaker 130. However, due to the nature of the duct 136a for delivering an acoustic signal, it may be difficult to efficiently remove the liquid using only repeated movement (e.g., regular movement) of the vibration plate 131. As the electronic device according to various embodiments of the disclosure changes a momentum (e.g., acceleration or movement amount) of the vibration plate 131 over time, it may efficiently remove liquid introduced into the duct 136a.

Figure 4:
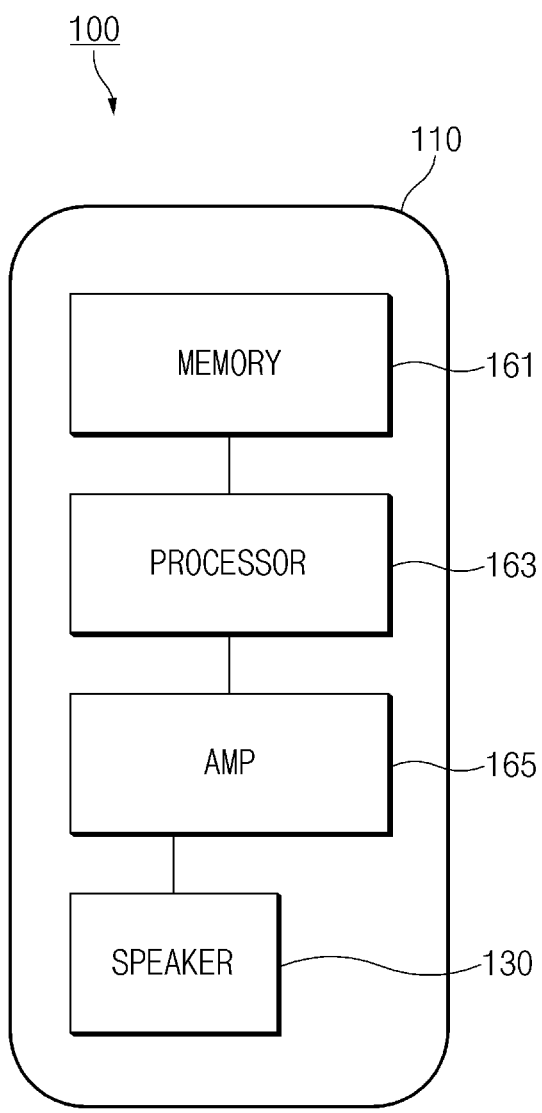
FIG. 4 is a block diagram illustrating an example configuration for describing an operation of forcing out liquid introduced into a speaker of an electronic device according to various embodiments.

FIG. 4 is a block diagram illustrating an example configuration for describing an operation of forcing out liquid introduced into a speaker of an electronic device according to various embodiments.

Referring to FIG. 4, an electronic device 100 may force out liquid introduced into a duct (e.g., a duct 136a of FIG. 3) of a speaker 130. A memory 161, a processor (e.g., including processing circuitry) 163, and an amplifier (AMP) 165 may be mounted on a PCB (e.g., a PCB 160 of FIG. 1).

According to an embodiment, the speaker 130 may output a specified sound. For example, the speaker 130 may generate an acoustic signal and may output the generated acoustic signal to the outside of the electronic device 100 through the duct (e.g., the duct 136a of FIG. 3).

According to an embodiment, liquid may be introduced into the duct of the speaker 130. For example, liquid may be introduced into the duct of the speaker 130 through a speaker hole (e.g., a speaker hole 111a of FIG. 2) formed in a housing (e.g., a housing 110 of FIG. 1). According to an embodiment, the speaker 130 may force out liquid which exists in the duct. For example, liquid introduced into the duct may be forced out by movement of a vibration plate (e.g., a vibration plate 131 of FIG. 3) of the speaker 130.

According to an embodiment, the memory 161 may store data for controlling movement of the vibration plate. For example, the memory 161 may store data associated with an acoustic signal. The data associated with the acoustic signal may be data associated with, for example, a sound of content. Moreover, the data may be data associated with a signal for controlling movement of the vibration plate to force out liquid introduced into the speaker 130.

According to an embodiment, the processor 163 may control an overall operation of the electronic device 100. According to an embodiment, when an instruction stored in the memory 161 is executed, the processor 163 may perform an operation for controlling the electronic device 100.

According to an embodiment, the processor 163 may include various processing circuitry and control the speaker 130 via the AMP 165. For example, the processor 163 may control the speaker 130 by applying a signal to a voice coil (e.g., a voice coil 132 of FIG. 3) of the speaker 130 via the AMP 165. The voice call may move according to the applied signal, and the vibration plate (e.g., the vibration plate 131 of FIG. 3) of the speaker 130 may move by the movement of the voice coil. According to an embodiment, the processor 163 may control the speaker 130 to output an acoustic signal (or a sound).

According to an embodiment, when liquid is introduced into the duct of the speaker 130, the output acoustic signal may become small in level. Thus, the processor 163 may perform a control operation for forcing out the liquid introduced into the speaker 130.

According to an embodiment, the processor 163 may determine whether there is liquid in the duct of the speaker 130 by means of a plurality of sensors included in the electronic device 100. For example, the processor 163 may obtain data about an environment around the electronic device 100 by means of the plurality of sensors and may determine whether there is liquid in the duct of the speaker 130 based on the obtained data. The plurality of sensors may include, for example, and without limitation, a pressure sensor, an optical sensor, a moisture sensor, an impedance sensor, or the like. According to an embodiment, the processor 163 may detect a change in an environment inside and outside the speaker 130 by means of the plurality of sensors and may determine whether there is liquid in the duct of the speaker 130.

According to an embodiment, the processor 163 may measure an impedance of the speaker 130 and may determine whether there is liquid in the duct of the speaker 130. When there is the liquid in the duct of the speaker 130, the impedance of the speaker 130 may be measured to be lower than a specified value. Thus, when the impedance of the speaker 130 is measured to be lower than the specified value, the processor 163 may determine that there is liquid in the speaker 130.

Figure 5:
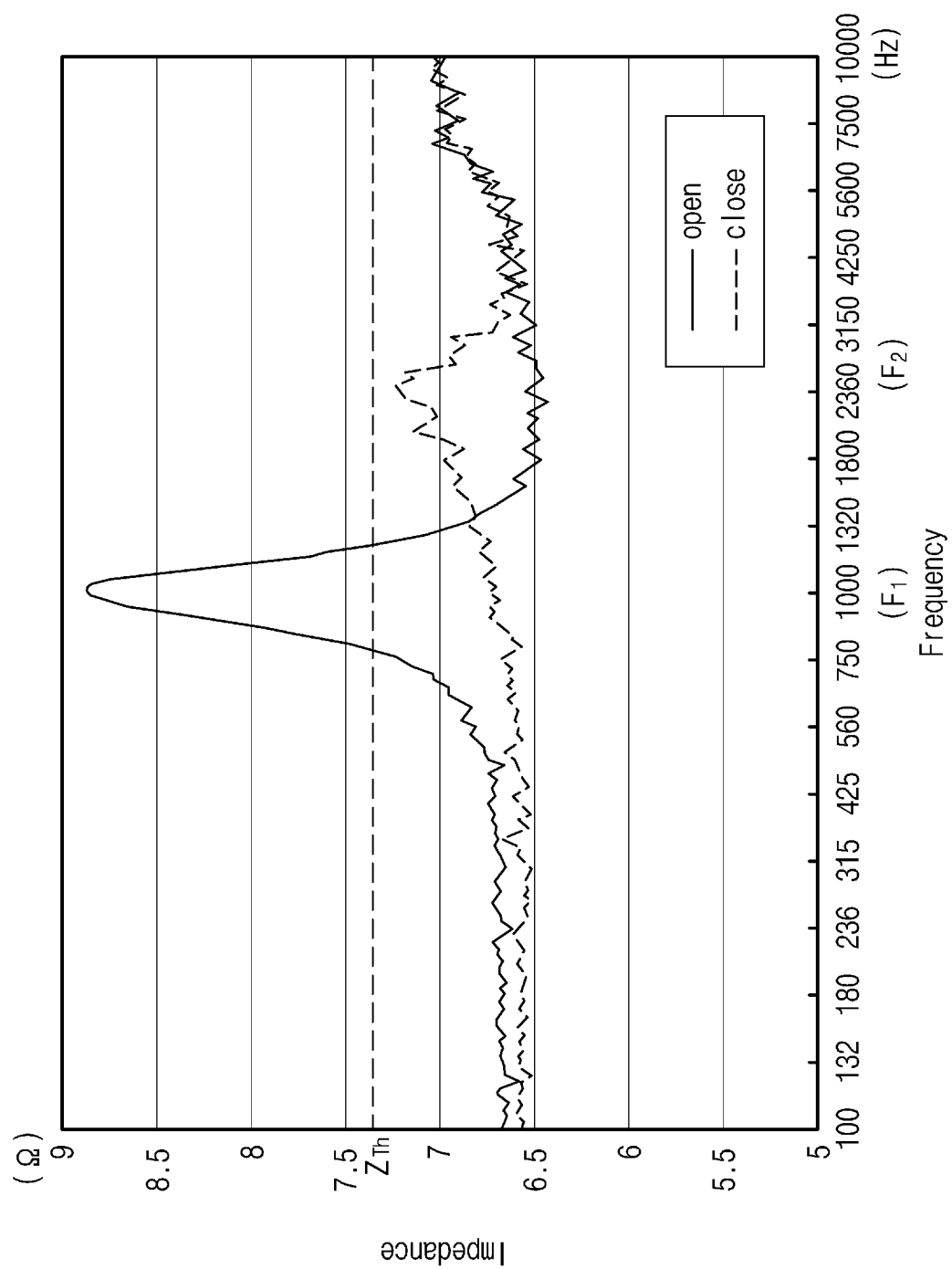
FIG. 5 is a graph illustrating example values obtained by measuring an impedance of a speaker at an electronic device, according to an embodiment.

FIG. 5 is a graph illustrating example values obtained by measuring an impedance of a speaker at an electronic device, according to an embodiment.

Referring to FIG. 5, an electronic device (e.g., an electronic device 100 of FIG. 1) may determine whether there is liquid in a duct (e.g., a duct 136a of FIG. 3) based on an impedance of a speaker (e.g., a speaker 130 of FIG. 1), measured at a resonant frequency.

According to an embodiment, the electronic device may apply a voltage (or current) of a specified frequency to the speaker to measure an impedance of the speaker. The specified frequency may be, for example, a resonant frequency of the speaker. The resonant frequency may change according to whether there is liquid in a duct of the speaker ($F_1 \rightarrow F_2$).

According to an embodiment, when there is no liquid in the duct (open), an impedance of the speaker may be greater than or equal to a specified impedance (or a specified value) $Z_{th}$ at the first resonant frequency $F_1$. According to an embodiment, when there is liquid in the duct (close), the impedance of the speaker may be greater than or equal to the specified impedance $Z_{th}$ at the second resonant frequency $F_2$. The specified impedance $Z_{th}$ may be determined according to, for example, a type of the speaker.

According to an embodiment, when impedance measured at the resonant frequency is less than or equal to the specified impedance $Z_{th}$, the electronic device may determine whether there is liquid in the duct of the speaker.

Referring to FIG. 4, a processor 163 may change a momentum (e.g., acceleration or movement amount) of a vibration plate (e.g., a vibration plate 131 of FIG. 3) over time and may force out liquid which exists in the duct of the speaker 130. For example, the processor 163 may provide a signal stored in a memory 161 to the speaker 130 to control movement of the vibration plate, thus changing a momentum of the vibration plate over time. According to an embodiment, the processor 163 may provide a first signal to a voice coil (e.g., a voice coil 132 of FIG. 3) via an AMP (e.g., an AMP 165 of FIG. 4) such that the vibration plate of the speaker 130 moves in a first direction by a first distance and may provide a second signal to the voice coil via the AMP such that the vibration plate moves in a second direction different from the first direction and/or moves by a second distance different from the first distance, thus changing a momentum of the vibration plate over time. Thus, liquid which exists in the duct of the speaker 130 may be forced out.

According to an embodiment, the processor 163 may determine whether there is liquid in the speaker 130. When there is the liquid in the duct of the speaker 130, the processor 163 may control the speaker 130 to force out the liquid which exists in the duct. In other words, when there is the liquid in the duct of the speaker 130, the processor 163 may change a momentum of the vibration plate over time. The processor 163 may determine whether there is liquid in the duct of the speaker 130 by means of, for example, a plurality of sensors. According to another embodiment, when the electronic device 163 is in a specified state, the processor 163 may control the speaker 130 to force out liquid which exists in the duct. The specified state may include, for example, and without limitation, a state where a waterproof mode is released, a state where a specified application (e.g., a music application or a call application) is executed, a state where a user input for performing a liquid emission function is received, or the like.

According to an embodiment, the processor 163 may change a frequency of an applied signal to change a momentum of the vibration plate over time. In other words, the processor 163 may change a frequency of an acoustic signal output via the speaker 130 to change a momentum of the vibration plate over time.

According to an embodiment, the processor 163 may change a frequency of a signal applied to the speaker 130, such that an acoustic signal of a frequency within a specified range is output via the speaker 130. The specified range may be, for example, about 0 to 20,000 Hz. The specified range may include a non-audible frequency range (about 20 Hz or less or about 20,000 Hz or more) as well as an audible frequency range (about 20 to 20,000 Hz). When liquid in the duct is forced out using a signal of the non-audible frequency signal, a user may not recognize an acoustic signal output via the speaker 130.

According to an embodiment, the processor 163 may control a level of voltage (or current) applied to the speaker 130 (e.g., the voice coil 132) to output an acoustic signal of maximum amplitude. The level of the voltage may be determined based on, for example, a structure of the duct. According to an embodiment, the processor 163 may change a frequency of the applied signal over a specified period. The specified period may be determined based on a structure where the speaker 130 is mounted and specifications of the speaker 130. According to an embodiment, the processor 163 may control the speaker 130 to perform an operation for forcing out liquid in the duct during a specified time. The specified time may be determined based on, for example, the specified period and the structure where the speaker 130 is mounted.

According to an embodiment, the processor 163 may additionally apply a second signal, which may be identical in frequency and may be different in phase from a first signal applied to the speaker 130, to the speaker 130 to change a momentum of the vibration over time. For example, the processor 163 may apply the first signal to the voice call (e.g., the voice call 132 of FIG. 3) of the speaker 130 and may apply the second signal to the voice coil of the speaker 130 together with the first signal after a first time to control movement of the vibration plate. A frequency of each of the first signal and the second signal may be determined within, for example, about 0 to 20,000 Hz.

According to an embodiment, the processor 163 may apply a voltage of a specified level to the speaker 130. The voltage of the specified level may be determined in, for example, a random manner. According to an embodiment, the processor 163 may control the speaker 130 to perform an operation for forcing out liquid in the duct during a second time. The first time and the second time may be determined based on a structure where the speaker 130 is mounted and specifications of the speaker 130.

For example, the processor 163 may apply a first signal of 800 Hz to the speaker 130. The processor 163 may apply a second signal of 800 Hz, having a phase difference of 30° with the first signal, together with the first signal to the speaker 130 after 0.1 seconds. The processor 163 may apply a third signal of 800 Hz, having a phase difference of 45° with the first signal, together with the first signal rather than the second signal to the speaker 130 after 0.2 seconds. The processor 163 may apply a fourth signal of 800 Hz, having a phase difference of 60° with the first signal, together with the first signal rather than the third signal to the speaker 130 after 0.3 seconds. The processor 163 may apply a fifth signal of 800 Hz, having a phase difference of 110° with the first signal, together with the first signal rather than the fourth signal to the speaker 130 after 0.4 seconds. Thus, the momentum of the vibration plate may change over time. It will be understood by those skilled in the art that the above are merely non-limiting examples, and many other variations in frequency, phase and time may be used.

According to an embodiment, the processor 163 may sequentially apply direct current (DC) voltages (or DC currents) of different levels to the speaker 130 (e.g., the voice coil 132 of FIG. 3) to change a location of the vibration plate, thus changing a momentum of the vibration plate over time. A location of the vibration plate may be determined according to a DC voltage applied to the speaker 130. In other words, while a specified DC voltage is applied to the speaker 130, the vibration plate may be fixed at a specified location. When the location of the vibration plate is fixed, the speaker 130 may fail to output an acoustic signal (or a tone).

According to an embodiment, the processor 163 may sequentially apply the first signal and the second signal to the speaker 130 to change a location of the vibration plate of the speaker 130, thus changing a momentum of the vibration plate over time. The first signal and the second signal may be DC voltages of different levels.

According to an embodiment, the processor 163 may apply each of different DC voltages during the same time. The processor 163 may apply each of different DC voltages during a different time. According to an embodiment, the processor 163 may control the speaker 130 to perform an operation for forcing out liquid in the duct during a specified time. The specified time may be determined based on a structure where the speaker 130 is mounted and specifications of the speaker 130.

Figure 6:
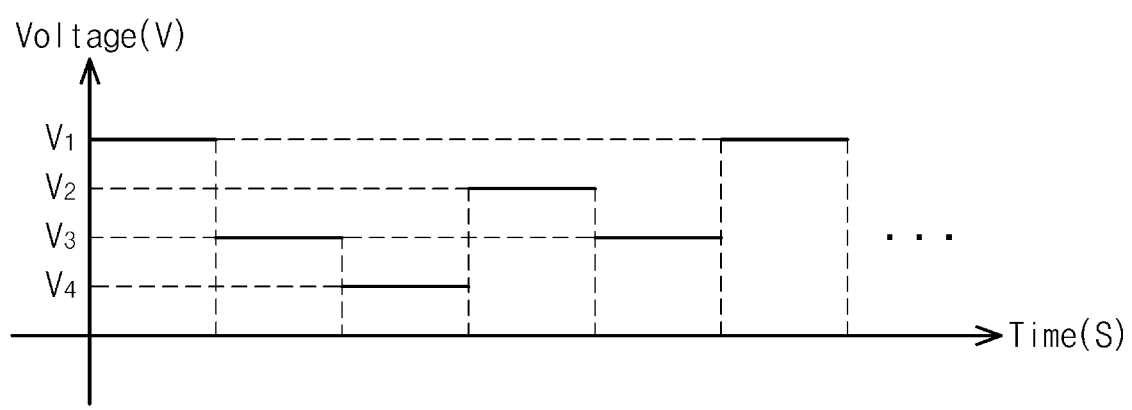
FIG. 6 is a graph illustrating an example profile defining a location of a vibration plate of an electronic device according to an embodiment.

FIG. 6 is a graph illustrating an example profile defining a location of a vibration plate of an electronic device according to an embodiment.

Referring to FIG. 6, a processor 163 of FIG. 4 may sequentially apply DC voltages of different levels depending on a profile defining a sequential location of a vibration plate (e.g., a vibration plate 131 of FIG. 3). The profile may include, for example, information about DC voltages which are sequentially applied.

For example, the processor 163 may apply a first voltage $V_1$ to a speaker 130 of FIG. 4 during a specified time to fix the vibration plate at a first location. The processor 163 may apply a second voltage $V_2$ during a specified time after applying the first voltage $V_1$ to fix the vibration plate at a second location. The processor 163 may apply a third voltage $V_3$ to the speaker 130 during a specified time after applying the second voltage $V_2$ to fix the vibration plate at a third location. The processor 163 may apply a fourth voltage $V_4$ to the speaker 130 during a specified time after applying the third voltage $V_3$ to fix the vibration plate at a fourth location. The processor 163 may apply the second voltage $V_2$ to the speaker 130 again during a specified time after applying the fourth voltage $V_4$ to fix the vibration plate at the second location again. The processor 163 may apply the first voltage $V_1$ to the speaker 130 again during a specified time after applying the second voltage $V_2$ again to fix the vibration plate again at the first location. Thus, the vibration plate may be sequentially fixed at the first location, the second location, the third location, the fourth location, the second location, and the first location, and a momentum of the vibration plate may change over time. It will be understood that the above is merely a non-limiting example, and that the disclosure is not limited thereto.

Referring to FIG. 4, the processor 163 may sequentially apply signals of different wave forms to the speaker 130 to change a momentum of the vibration plate (e.g., the vibration plate 131 of FIG. 3) over time. For example, the processor 163 may control movement of the vibration plate to output a first signal of a first waveform to the speaker 130 and may apply a second signal of a second waveform to the speaker 130 after a specified time to control movement of the vibration plate, thus changing a momentum of the vibration plate over time. The signals of the different waveforms may include, for example, and without limitation, signals, each of which has a rectangular waveform, a triangular waveform, a sawtooth waveform, a pulse waveform, or the like, which are different from each other.

According to an embodiment, the processor 163 may apply a voltage of a specified level to the speaker 130. The voltage of the specified level may be determined in, for example, a random manner. According to an embodiment, the processor 163 may control the speaker 130 to perform an operation for forcing out liquid in a duct during a specified time. The specified time may be determined based on a structure where the speaker 130 is mounted and specifications of the speaker 130.

According to an embodiment, the processor 163 may apply a plurality of signals of different frequencies together to the speaker 130 and may change levels of some of the plurality of signals after a specified time, thus changing a momentum of the vibration plate over time. For example, the processor 163 may apply the plurality of signals to the speaker 130 to control a momentum of the vibration plate and may change levels of some of the plurality of signals after a specified time to control movement of the vibration plate, thus changing a momentum of the vibration plate over time. The different frequencies may be determined by dividing, for example, a frequency of one octave range by a specified interval. The specified interval may, for example, and without limitation, be ⅓ or ½ of the frequency of the one octave range.

According to an embodiment, the processor 163 may determine levels of the plurality of signals in a range where an acoustic signal of maximum amplitude is less than or equal to a level of voltage (or current) output from the speaker 130. The level of the voltage may be determined based on, for example, a structure of the duct. According to an embodiment, the processor 163 may change levels of some of the plurality of signals over a specified period. The specified period may be determined based on a structure where the speaker 130 is mounted and specifications of the speaker 130. According to an embodiment, the processor 163 may control the speaker 130 to perform an operation for forcing out liquid in the duct during a specified time. The specified time may be determined based on, for example, the specified period and the structure where the speaker 130 is mounted.

According to an embodiment, the processor 163 may output a first signal of 200 Hz, a second signal of 400 Hz, a third signal of 600 Hz, a fourth signal of 800 Hz, and a fifth signal of 1000 Hz together, but it will be understood that the disclosure is not limited thereto.

For example, in a 1-step gain, the processor 163 may apply the first to fifth signals, each of which has 10 dB, to the speaker 130. In a 2-step gain, the processor 163 may change the fifth signal to 1 dB with respect to the 1-step gain and may apply the changed signal to the speaker 130. In a 3-step gain, the processor 163 may change the fourth signal to 1 dB with respect to the 2-step gain and may apply the changed signal to the speaker 130. In a 4-step gain, the processor 163 may change the third signal to 1 dB with respect to the 3-step gain and may apply the changed signal to the speaker 130. In a 5-step gain, the processor 163 may change the second signal to 1 dB with respect to the 4-step gain and may apply the changed signal to the speaker 130. Each step gain may be maintained during, for example, a specified time. Thus, a momentum of the vibration plate may change over time. It will be understood that the foregoing describes non-limiting examples, and that the disclosure is not limited thereto.

For another example, in a 1-step gain, the processor 163 may apply the first signal of 10 dB among the first to fifth signals to the speaker 130 and may apply the others, each of which has 1 dB, to the speaker 130. In a 2-step gain, the processor 163 may change the second signal among the first to fifth signals to 10 dB and may apply the changed signal to the speaker 130, thus applying the others, each of which has 1 dB, to the speaker 130. In a 3-step gain, the processor 163 may change the third signal among the first to fifth signals to 10 dB and may apply the changed signal to the speaker 130, thus applying the others, each of which has 1 dB, to the speaker 130. In a 4-step gain, the processor 163 may change the fourth signal among the first to fifth signals to 10 dB and may apply the changed signal to the speaker 130, thus applying the others, each of which has 1 dB, to the speaker 130. In a 5-step gain, the processor 163 may change the fifth signal among the first to fifth signals to 10 dB and may apply the changed signal to the speaker 130, thus applying the others, each of which has 1 dB, to the speaker 130. It will be understood that the foregoing describes non-limiting examples, and that the disclosure is not limited thereto.

According to an embodiment, the processor 163 may apply a first signal and a second signal of different frequencies within a specified range to the speaker 130 and/or may change a level of one of the first signal and the second signal after a specified time to change a momentum of the vibration plate over time. For example, the processor 163 may apply the first signal and the second signal together to the speaker 130 to control movement of the vibration plate and may change a level of one of the first signal and the second signal after a specified time to control movement of the vibration plate, thus changing a momentum of the vibration plate over time. The specified range may be a range where a beat effect is able to occur. In other words, a first frequency of the first signal and a second frequency of the second signal may be frequencies which are close to each other.

According to an embodiment, in a range where an acoustic signal of maximum amplitude is less than or equal to a level of voltage (or current) output from the speaker 130, the processor 163 may determine levels of the first signal and the second signal. The level of the voltage may be determined based on, for example, a structure of the duct. According to an embodiment, the processor 163 may change levels of some of the plurality of signals over a specified period. The specified period may be determined based on a structure where the speaker 130 is mounted and specifications of the speaker 130. According to an embodiment, the processor 163 may control the speaker 130 to perform an operation for forcing out liquid in the duct during a specified time. The specified time may be determined based on, for example, the specified period and the structure where the speaker 130 is mounted.

According to another embodiment, when the configuration for outputting an acoustic signal includes a digital signal processor (DSP), the configuration including the DSP rather than the processor 163 may control the speaker 130 to perform an operation for forcing out liquid included in the duct.

Figure 7:
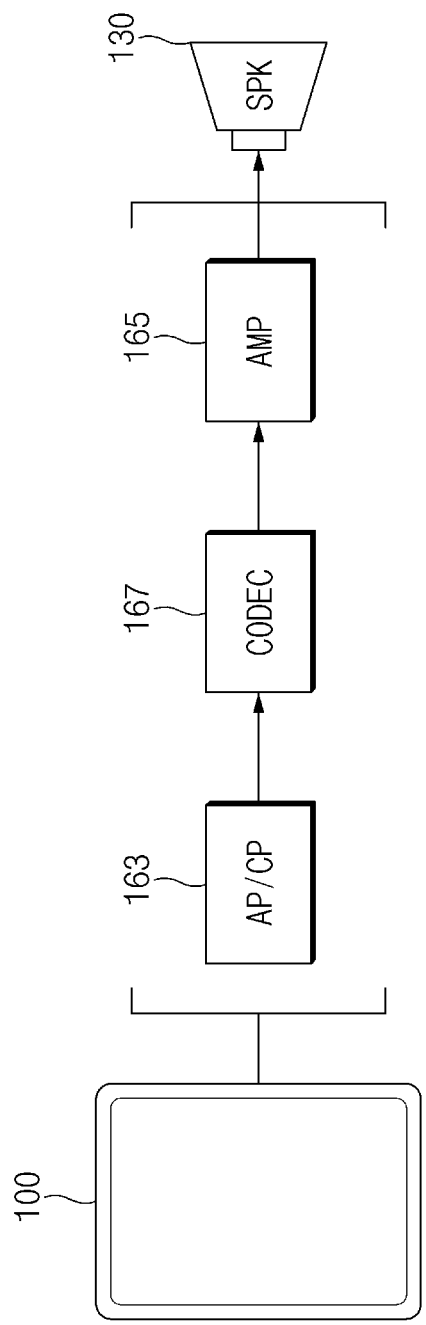
FIG. 7 is a diagram illustrating an example configuration for outputting an acoustic signal in an electronic device according to an embodiment.

FIG. 7 is a diagram illustrating an example configuration for outputting an acoustic signal in an electronic device according to an embodiment.

Referring to FIG. 7, an electronic device 100 may deliver a signal to a speaker (SPK) 130 via a processor (e.g., an application processor (AP)/central processor (CP)) 163, an AMP 165, a CODEC 167 and may output an acoustic signal. The AMP 165 and the CODEC 167 may be mounted on, for example, a PCB (e.g., a PCB 160 of FIG. 1).

According to an embodiment, the CODEC 167 may decrypt an encrypted acoustic signal. For example, the CODEC 167 may decrypt the encrypted acoustic signal depending on a specified format. The specified format may be one of formats, for example, and without limitation, AC3, AMR, ACC, MPEG, WMA, or the like. According to an embodiment, the AMP 165 may amplify an output acoustic signal. According to an embodiment, the AMP 165 may include a DSP. The DSP may change a digital acoustic signal to an analog acoustic signal to be output via the speaker 130. When the AMP 165 does not include the DSP, the processor 163 may change a digital acoustic signal to an analog acoustic signal.

According to an embodiment, when the AMP 165 includes the DSP, rather than the processor 163, the AMP 165 may control the speaker 130 using the DSP to force out liquid in a duct. Thus, the electronic device 100 may perform an operation for forcing out liquid in the duct with a low power.

Figure 8:
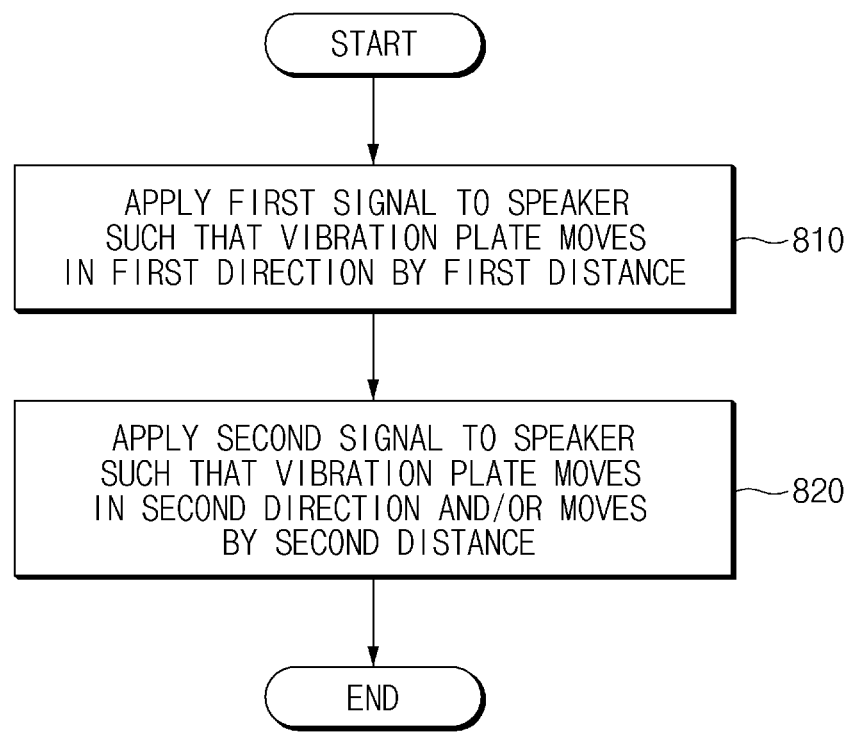
FIG. 8 is a flowchart illustrating an example method for forcing out liquid in a duct in an electronic device according to various embodiments.

FIG. 8 is a flowchart illustrating an example method for forcing out liquid in a duct in an electronic device according to various embodiments.

According to an embodiment, in operation 810, an electronic device (e.g., a processor 163 of FIG. 4) may apply a first signal to a voice coil (e.g., a voice coil 132 of FIG. 3) of a speaker (e.g., a speaker 130 of FIG. 3) via an AMP such that a vibration plate (e.g., a vibration plate 131 of FIG. 3) which moves based on a signal applied to the voice coil moves in a first direction by a first distance.

According to an embodiment, in operation 820, the electronic device may apply a second signal to the voice coil via the AMP such that the vibration plate moves in a second direction different from the first direction and/or moves by a second distance different from the first distance.

Thus, liquid which exists in an acoustic cavity of the speaker may be forced out to the outside of the speaker.

According to various embodiments, when receiving a user input, the electronic device may perform operation 820 of controlling the speaker and forcing out liquid which exists in a duct. According to an embodiment, the electronic device may further include a user interface for receiving the user input. The electronic device may receive the user input through, for example, the user interface.

According to various embodiments, when the electronic device is in a specified state, it may perform operation 820 of controlling the speaker and forcing out liquid which exists in the duct. The specified state may include, for example, and without limitation, a state where a waterproof mode is released, a state where a specified application (e.g., a music application or a call application) is executed, a state where a user input for performing a liquid emission function is received, or the like.

Figure 9:
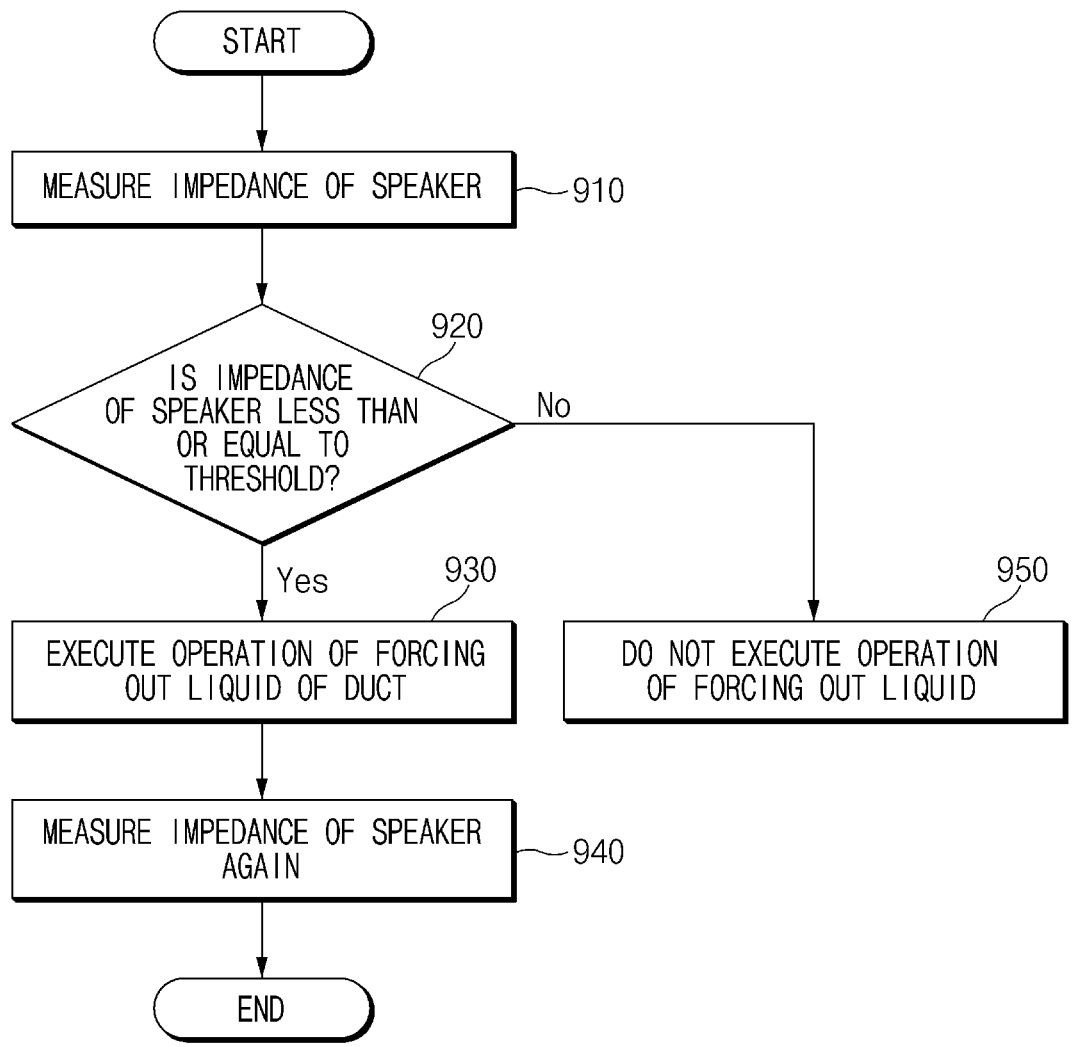
FIG. 9 is a flowchart illustrating an example method for measuring an impedance of a speaker and forcing out liquid in a duct in an electronic device according to an embodiment.

FIG. 9 is a flowchart illustrating an example method for measuring an impedance of a speaker and forcing out liquid in a duct in an electronic device according to an embodiment.

According to an embodiment, in operation 910, an electronic device (e.g., a processor 163 of FIG. 4) may measure an impedance of a speaker (e.g., a speaker 130 of FIG. 1).

According to an embodiment, in operation 920, the electronic device may determine whether the impedance of the speaker is less than or equal to a specified value. According to an embodiment, when the measured impedance is less than or equal to the specified value (Yes), in operation 930, the electronic device may perform an operation of forcing out liquid in a duct. According to an embodiment, after completing the operation of forcing out the liquid, in operation 940, the electronic device may measure an impedance of the speaker again. Thus, when liquid remains in the duct, the electronic device may perform an operation of forcing out the liquid in the duct.

According to an embodiment, when the measured impedance is greater than the specified value (No), in operation 950, the electronic device may not perform the operation of forcing out the liquid in the duct.

The electronic device 100 according to various embodiments of the disclosure described with reference to FIGS. 1, 2, 3, 4, 5, 6, 7, 8 and 9 may change the momentum of the vibration plate over time to quickly and efficiently remove liquid in the duct for outputting an acoustic signal.

An electronic device according to various embodiment of the disclosure may include a memory, a housing, an acoustic module comprising a coil and an acoustic membrane configured to be movable based on a signal applied to the coil the acoustic module being disposed in an internal space of the housing, an amplifier electrically connected with the acoustic module, and a processor configured to control the acoustic module. Instructions stored in the memory, when executed by the processor, may cause the processor to apply a first signal to the coil via the amplifier to move the acoustic membrane in a first direction by a first distance to force out at least a portion of liquid introduced into at least a portion of the internal space to the outside of the internal space using the acoustic membrane by applying a second signal to the coil via the amplifier to move the acoustic membrane in a second direction different from the first direction and/or move the acoustic membrane by a second distance different from the first distance after applying the first signal to the coil.

In the electronic device according to an embodiment of the disclosure, the first signal and the second signal may be direct current (DC) voltages of different levels.

In the electronic device according to an embodiment of the disclosure, the instructions may, when executed by the processor, cause the processor to determine the first signal and/or the second signal based at least on a profile defining a sequential location of the acoustic membrane over time.

In the electronic device according to an embodiment of the disclosure, the instructions may, when executed by the processor, cause the processor to apply the first signal of a first frequency to the coil and apply the second signal of the first frequency together with the first signal to the coil after a specified time, the second signal being different in phase from the first signal.

In the electronic device according to an embodiment of the disclosure, the first signal and the second signal may be signals having different waveforms.

In the electronic device according to an embodiment of the disclosure, each of the first signal and the second signal may include signals, each of which has at least one of a rectangular waveform, a triangular waveform, a sawtooth waveform, or a pulse waveform.

In the electronic device according to an embodiment of the disclosure, the first signal and the second signal may be signals of different frequencies. The instructions may, when executed by the processor, cause the processor to apply the first signal and the second signal together to the coil and change an amplitude of the second signal after a specified time.

In the electronic device according to an embodiment of the disclosure, the different frequencies may be determined by dividing a frequency of one octave range by a specified interval.

In the electronic device according to an embodiment of the disclosure, the specified interval may be ⅓ or ½ of the frequency of one octave range.

The electronic device according to an embodiment of the disclosure may further include at least one sensor configured to obtain data about an environment inside and outside the electronic device. The instructions, when executed by the processor, may cause the processor to determine whether there is the liquid in the internal space based on data obtained by the at least one sensor and to apply the first signal to the coil via the amplifier and/or apply the second signal to the coil via the amplifier, based at least on a determination that there is the liquid in the internal space.

The electronic device according to an embodiment of the disclosure may further include a user interface. The instructions, when executed by the processor, may cause the processor to receive an input through the user interface, the input associated with performing an operation in which the electronic device forces out the liquid and apply the first signal to the coil via the amplifier and/or apply the second signal to the coil via the amplifier, depending on the received input.

In the electronic device according to an embodiment of the disclosure, the instructions, when executed by the processor, may cause the processor to apply the first signal to the coil via the amplifier and/or apply the second signal to the coil via the amplifier, before outputting an audio via the acoustic module or after executing a waterproof mode.

In the electronic device according to an embodiment of the disclosure, the housing may be a housing defining an external shape and an internal structure of the electronic device and/or a housing defining an internal structure of the acoustic module.

A method of controlling an electronic device for forcing out liquid in an acoustic cavity in the electronic device including an acoustic module comprising a coil and an acoustic membrane and a housing in which the acoustic module is disposed, may include applying a first signal to the coil via an amplifier to move the acoustic membrane in a first direction by a first distance and applying a second signal to the coil via the amplifier to move the acoustic membrane in a second direction different from the first direction and/or moves the acoustic membrane by a second distance different from the first distance after applying the first signal to the coil.

In the method according to an embodiment of the disclosure, the first signal and the second signal may be DC voltages of different levels. The applying of the first signal to the coil may include arranging the acoustic membrane on a first location by applying the first signal to the coil. The applying of the second signal to the coil may include arranging the acoustic membrane on a second location by applying the second signal to the coil.

The method according to an embodiment of the disclosure may further include determining the first signal or the second signal sequentially depending on a profile defining a sequential location of the acoustic membrane over time.

In the method according to an embodiment of the disclosure, the applying of the first signal to the coil may include applying the first signal of a first frequency to the coil. The applying of the second signal to the coil may include applying the second signal of the first frequency together with the first signal to the coil after a specified time, the second signal being different in phase from the first signal.

In the method according to an embodiment of the disclosure, the first signal and the second signal may be signals having different waveforms.

In the method according to an embodiment of the disclosure, each of the first signal and the second signal may include at least one signal, each signal having at least one of a rectangular waveform, a triangular waveform, a sawtooth waveform, or a pulse waveform.

The method according to an embodiment of the disclosure may further include determining whether there is liquid in the acoustic cavity based on data about an environment inside and outside the electronic device, the data being obtained by at least one sensor of the electronic device.

Figure 10:
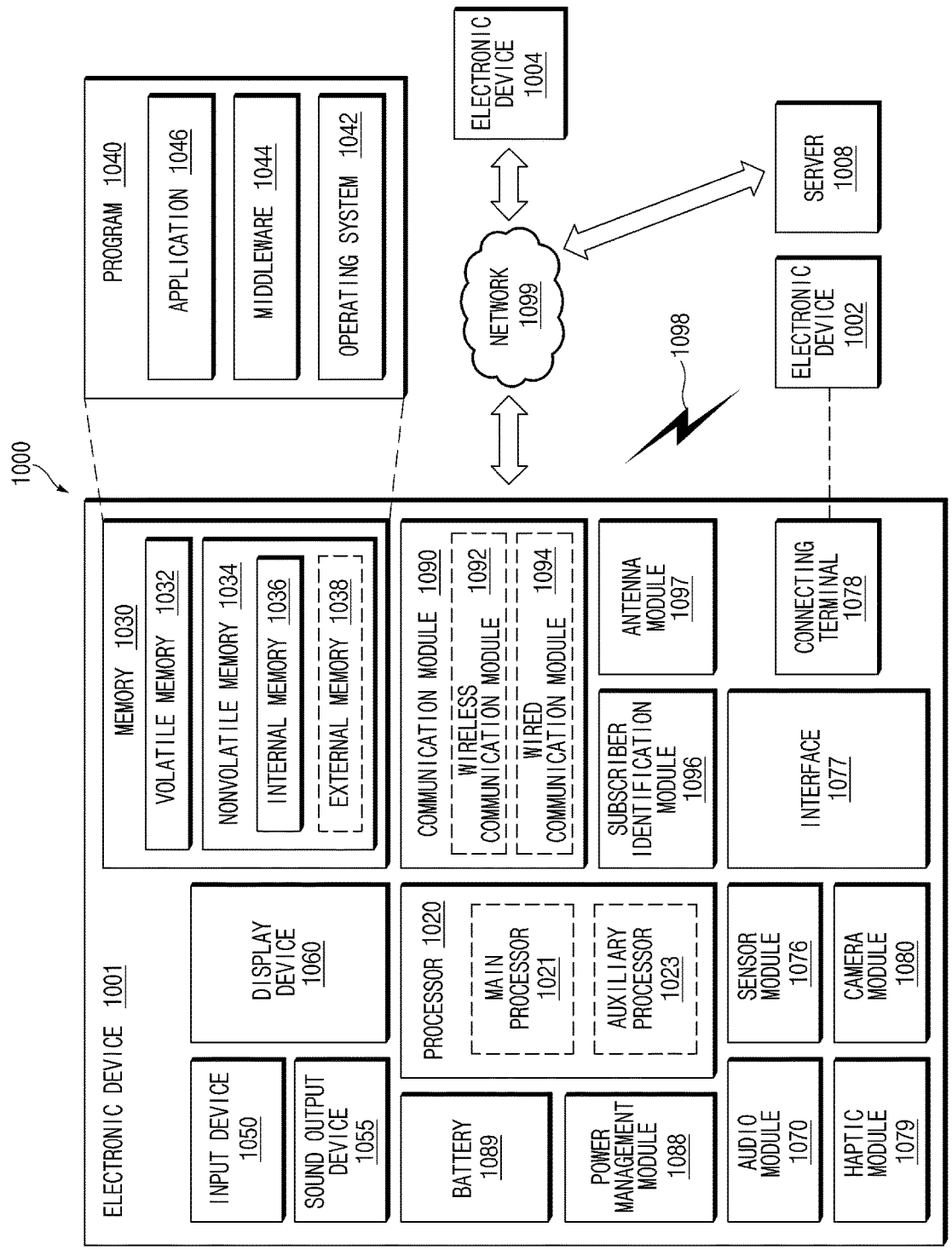
FIG. 10 is a block diagram illustrating an example electronic device in a network environment, according to various embodiments.

FIG. 10 is a block diagram illustrating an electronic device 1001 in a network environment 1000 according to various embodiments. Referring to FIG. 10, the electronic device 1001 in the network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may load a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by other component (e.g., the processor 1020) of the electronic device 1001, from the outside (e.g., a user) of the electronic device 1001. The input device 1050 may include, for example, a microphone, a mouse, a keyboard, or a digital pen (e.g., a stylus pen).

The sound output device 1055 may output sound signals to the outside of the electronic device 1001. The sound output device 1055 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. According to an embodiment, the display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., PCB). According to an embodiment, the antenna module 1097 may include a plurality of antennas. In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
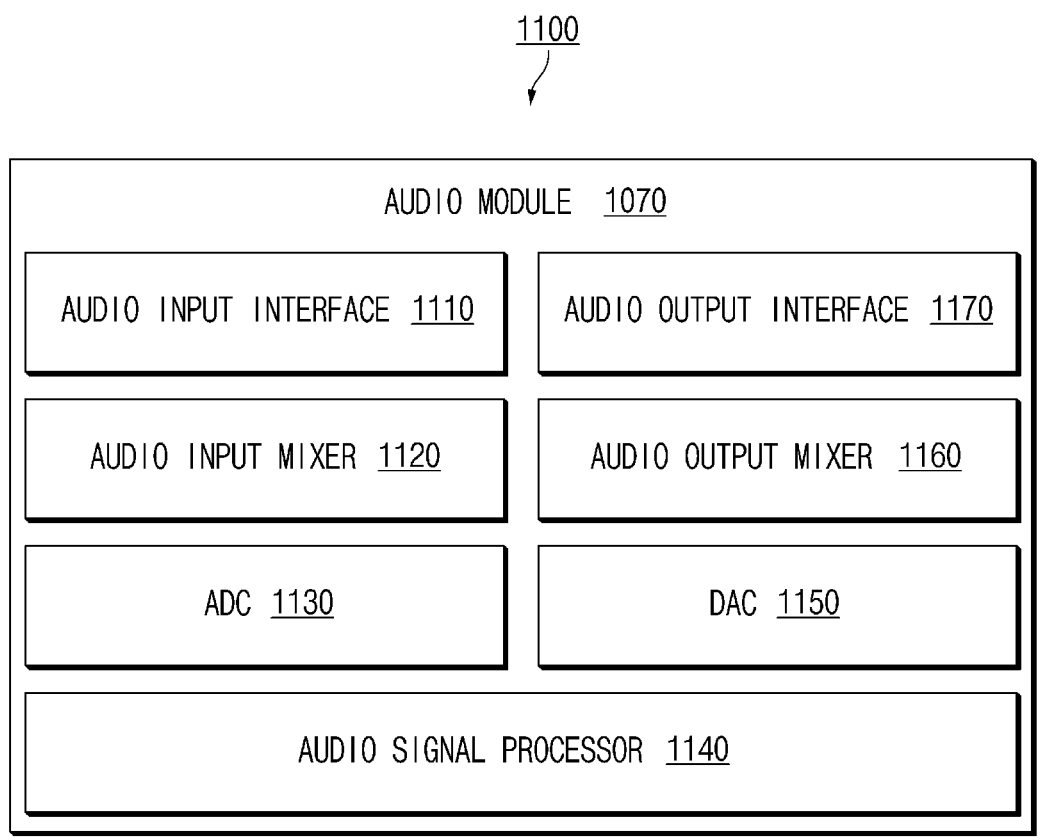
FIG. 11 is a block diagram illustrating an example audio module, according to various embodiments.

FIG. 11 is a block diagram 1100 illustrating the audio module 1070 according to various embodiments. Referring to FIG. 11, the audio module 1070 may include, for example, an audio input interface 1110, an audio input mixer 1120, an analog-to-digital converter (ADC) 1130, an audio signal processor 1140, a digital-to-analog converter (DAC) 1150, an audio output mixer 1160, or an audio output interface 1170.

The audio input interface 1110 may receive an audio signal corresponding to a sound obtained from the outside of the electronic device 1001 via a microphone (e.g., a dynamic microphone, a condenser microphone, or a piezo microphone) that is configured as part of the input device 1050 or separately from the electronic device 1001. For example, if an audio signal is obtained from the external electronic device 1002 (e.g., a headset or a microphone), the audio input interface 1110 may be connected with the external electronic device 1002 directly via the connecting terminal 1078, or wirelessly (e.g., Bluetooth™ communication) via the wireless communication module 1092 to receive the audio signal. According to an embodiment, the audio input interface 1110 may receive a control signal (e.g., a volume adjustment signal received via an input button) related to the audio signal obtained from the external electronic device 1002. The audio input interface 1110 may include a plurality of audio input channels and may receive a different audio signal via a corresponding one of the plurality of audio input channels, respectively. According to an embodiment, additionally or alternatively, the audio input interface 1110 may receive an audio signal from another component (e.g., the processor 1020 or the memory 1030) of the electronic device 1001.

The audio input mixer 1120 may synthesize a plurality of inputted audio signals into at least one audio signal. For example, according to an embodiment, the audio input mixer 1120 may synthesize a plurality of analog audio signals inputted via the audio input interface 1110 into at least one analog audio signal.

The ADC 1130 may convert an analog audio signal into a digital audio signal. For example, according to an embodiment, the ADC 1130 may convert an analog audio signal received via the audio input interface 1110 or, additionally or alternatively, an analog audio signal synthesized via the audio input mixer 1120 into a digital audio signal.

The audio signal processor 1140 may perform various processing on a digital audio signal received via the ADC 1130 or a digital audio signal received from another component of the electronic device 1001. For example, according to an embodiment, the audio signal processor 1140 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 1140 may be implemented in the form of an equalizer.

The DAC 1150 may convert a digital audio signal into an analog audio signal. For example, according to an embodiment, the DAC 1150 may convert a digital audio signal processed by the audio signal processor 1140 or a digital audio signal obtained from another component (e.g., the processor (1020) or the memory (1030)) of the electronic device 1001 into an analog audio signal.

The audio output mixer 1160 may synthesize a plurality of audio signals, which are to be outputted, into at least one audio signal. For example, according to an embodiment, the audio output mixer 1160 may synthesize an analog audio signal converted by the DAC 1150 and another analog audio signal (e.g., an analog audio signal received via the audio input interface 1110) into at least one analog audio signal.

The audio output interface 1170 may output an analog audio signal converted by the DAC 1150 or, additionally or alternatively, an analog audio signal synthesized by the audio output mixer 1160 to the outside of the electronic device 1001 via the sound output device 1055. The sound output device 1055 may include, for example, a speaker, such as a dynamic driver or a balanced armature driver, or a receiver. According to an embodiment, the sound output device 1055 may include a plurality of speakers. In such a case, the audio output interface 1170 may output audio signals having a plurality of different channels (e.g., stereo channels or 5.1 channels) via at least some of the plurality of speakers. According to an embodiment, the audio output interface 1170 may be connected with the external electronic device 1002 (e.g., an external speaker or a headset) directly via the connecting terminal 1078 or wirelessly via the wireless communication module 1092 to output an audio signal.

According to an embodiment, the audio module 1070 may generate, without separately including the audio input mixer 1120 or the audio output mixer 1160, at least one digital audio signal by synthesizing a plurality of digital audio signals using at least one function of the audio signal processor 1140.

According to an embodiment, the audio module 1070 may include an audio amplifier (not shown) (e.g., a speaker amplifying circuit) that is capable of amplifying an analog audio signal inputted via the audio input interface 1110 or an audio signal that is to be outputted via the audio output interface 1170. According to an embodiment, the audio amplifier may be configured as a module separate from the audio module 1070.

The electronic device according to various embodiments disclosed in the disclosure may be various types of devices. The electronic device may include, for example, a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

Various embodiments of the disclosure and terms used herein are not intended to limit the technologies described in the disclosure to specific embodiments, and it should be understood that the embodiments and the terms include modification, equivalent, and/or alternative on the corresponding embodiments described herein. With regard to description of drawings, similar components may be marked by similar reference numerals. The terms of a singular form may include plural forms unless otherwise specified. In the disclosure disclosed herein, the expressions "A or B", "at least one of A and/or B", "A, B, or C", or "at least one of A, B, and/or C", and the like used herein may include any and all combinations of one or more of the associated listed items. Expressions such as "first," or "second," and the like, may express their components regardless of their priority or importance and may be used to distinguish one component from another component but is not limited to these components. When an (e.g., first) component is referred to as being "(operatively or communicatively) coupled with/to" or "connected to" another (e.g., second) component, it may be directly coupled with/to or connected to the other component or an intervening component (e.g., a third component) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing corresponding operations or a generic-purpose processor (e.g., a central processing unit (CPU) or an application processor (AP)) which performs corresponding operations by executing one or more software programs which are stored in a memory device (e.g., the memory 1030).

The term "module" used herein may include a unit, which is implemented with hardware, software, or firmware, and may be interchangeably used with the terms "logic", "logical block", "part", "circuit", or the like. The "module" may be a minimum unit of an integrated part or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media (e.g., the memory 1030) in the form of a program module. The instruction, when executed by a processor (e.g., the processor 1020), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each component (e.g., a module or a program module) according to various embodiments may be composed of single entity or a plurality of entities, a part of the above-described sub-components may be omitted, or other sub-components may be further included. Alternatively or additionally, after being integrated in one entity, some components (e.g., a module or a program module) may identically or similarly perform the function executed by each corresponding component before integration. According to various embodiments, operations executed by modules, program modules, or other components may be executed by a successive method, a parallel method, a repeated method, or a heuristic method, or at least one part of operations may be executed in different sequences or omitted. Alternatively, other operations may be added.

According to embodiments disclosed in the disclosure, the electronic device may change a momentum of the vibration plate over time to efficiently and quickly force out liquid in the duct for outputting an acoustic signal.

In addition, various effects directly or indirectly ascertained through the disclosure may be provided.

While the disclosure has been illustrated and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a memory;
   a housing;
   an acoustic module comprising a coil and an acoustic membrane configured to be movable based on a signal applied to the coil, the acoustic module disposed in an internal space of the housing;
   an amplifier electrically connected with the acoustic module; and
   a processor configured to control the acoustic module, wherein instructions stored in the memory, when executed by the processor, cause the processor to:
   apply a first signal to the coil via the amplifier to move the acoustic membrane in a first direction by a first distance; and
   apply a second signal to the coil via the amplifier to move the acoustic membrane in a second direction different from the first direction and/or to move the acoustic membrane by a second distance different from the first distance after applying the first signal to the coil, wherein the first signal and the second signal are direct current (DC) voltages having different levels, respectively, and/or the first signal and the second signal are signals have different waveforms, respectively.

2. The electronic device of claim 1, wherein the instructions, when executed by the processor, cause the processor to determine the first signal and/or the second signal based at least on a profile defining a sequential location of the acoustic membrane over time.

3. The electronic device of claim 1, wherein each of the first signal and the second signal includes at least one signal, each signal having at least one of a rectangular waveform, a triangular waveform, a sawtooth waveform, or a pulse waveform.

4. The electronic device of claim 1, further comprising:
   at least one sensor configured to obtain data about an environment inside and outside the electronic device,
   wherein the instructions, when executed by the processor, cause the processor to:
   determine whether there is liquid in the internal space based on data obtained by the at least one sensor; and
   apply the first signal to the coil via the amplifier and/or apply the second signal to the coil via the amplifier, based at least on a determination that there is the liquid in the internal space.

5. The electronic device of claim 1, further comprising:
   a user interface configured to receive an input,
   wherein the instructions, when executed by the processor, cause the processor to:
   receive an input through the user interface associated with performing an operation in which the electronic device forces out liquid; and
   apply the first signal to the coil via the amplifier and/or apply the second signal to the coil via the amplifier based on the received user input.

6. The electronic device of claim 1, wherein the instructions, when executed by the processor, cause the processor to:
   apply the first signal to the coil via the amplifier and/or apply the second signal to the coil via the amplifier, before outputting audio via the acoustic module and/or after executing a waterproof mode.

7. The electronic device of claim 1, wherein the housing defines an external shape and an internal structure of the electronic device and/or a housing defining an internal structure of the acoustic module.

8. An electronic device, comprising:
   a memory;
   a housing;
   an acoustic module comprising a coil and an acoustic membrane configured to be movable based on a signal applied to the coil, the acoustic module disposed in an internal space of the housing;
   an amplifier electrically connected with the acoustic module; and
   a processor configured to control the acoustic module, wherein instructions stored in the memory are configured to, when executed by the processor, cause the processor to:

apply a first signal to the coil via the amplifier to move the acoustic membrane in a first direction by a first distance;
apply a second signal to the coil via the amplifier to move the acoustic membrane in a second direction different from the first direction and/or to move the acoustic membrane by a second distance different from the first distance after applying the first signal to the coil;
apply the first signal having a first frequency to the coil; and
apply the second signal having the first frequency together with the first signal to the coil after a specified time, the second signal being different in phase from the first signal.

9. The electronic device of claim 8, wherein the first signal and the second signal are signals having different waveforms, respectively.

10. The electronic device of claim 8, further comprising:
at least one sensor configured to obtain data about an environment inside and outside the electronic device,
wherein the instructions, when executed by the processor, cause the processor to:
determine whether there is liquid in the internal space based on data obtained by the at least one sensor; and
apply the first signal to the coil via the amplifier and/or apply the second signal to the coil via the amplifier, based at least on a determination that there is the liquid in the internal space.

11. The electronic device of claim 8, further comprising:
a user interface configured to receive an input,
wherein the instructions, when executed by the processor, cause the processor to:
receive an input through the user interface associated with performing an operation in which the electronic device forces out liquid; and
apply the first signal to the coil via the amplifier and/or apply the second signal to the coil via the amplifier based on the received user input.

12. The electronic device of claim 8, wherein the instructions, when executed by the processor, cause the processor to:
apply the first signal to the coil via the amplifier and/or apply the second signal to the coil via the amplifier, before outputting audio via the acoustic module and/or after executing a waterproof mode.

13. The electronic device of claim 8, wherein the housing defines an external shape and an internal structure of the electronic device and/or a housing defining an internal structure of the acoustic module.

14. An electronic device, comprising:
a memory;
a housing;
an acoustic module comprising a coil and an acoustic membrane configured to be movable based on a signal applied to the coil, the acoustic module disposed in an internal space of the housing;
an amplifier electrically connected with the acoustic module; and
a processor configured to control the acoustic module,
wherein instructions stored in the memory are configured to, when executed by the processor, cause the processor to:
apply a first signal to the coil via the amplifier to move the acoustic membrane in a first direction by a first distance; and
apply a second signal to the coil via the amplifier to move the acoustic membrane in a second direction different from the first direction and/or to move the acoustic membrane by a second distance different from the first distance after applying the first signal to the coil, wherein the first signal and the second signal are signals having different frequencies, respectively, and
wherein the instructions, when executed by the processor, cause the processor to:
apply the first signal and the second signal together to the coil; and
change amplitude of the second signal after a specified time.

15. The electronic device of claim 14, wherein the different frequencies are determined by dividing a frequency of one octave range by a specified interval.

16. The electronic device of claim 15, wherein the specified interval is ⅓ or ½ of the frequency of the one octave range.

17. The electronic device of claim 14, further comprising:
at least one sensor configured to obtain data about an environment inside and outside the electronic device,
wherein the instructions, when executed by the processor, cause the processor to:
determine whether there is liquid in the internal space based on data obtained by the at least one sensor; and
apply the first signal to the coil via the amplifier and/or apply the second signal to the coil via the amplifier, based at least on a determination that there is the liquid in the internal space.

18. The electronic device of claim 14, further comprising:
a user interface configured to receive an input,
wherein the instructions, when executed by the processor, cause the processor to:
receive an input through the user interface associated with performing an operation in which the electronic device forces out liquid; and
apply the first signal to the coil via the amplifier and/or apply the second signal to the coil via the amplifier based on the received user input.

19. The electronic device of claim 14, wherein the instructions, when executed by the processor, cause the processor to:
apply the first signal to the coil via the amplifier and/or apply the second signal to the coil via the amplifier, before outputting audio via the acoustic module and/or after executing a waterproof mode.

20. The electronic device of claim 14, wherein the housing defines an external shape and an internal structure of the electronic device and/or a housing defining an internal structure of the acoustic module.

21. A method of controlling an electronic device for forcing out liquid in an acoustic cavity in the electronic device, the electronic device including an acoustic module comprising a coil and an acoustic membrane and a housingn which the acoustic module is disposed, the method comprising:
applying a first signal to the coil via an amplifier to move the acoustic membrane in a first direction by a first distance; and
applying a second signal to the coil via the amplifier to move the acoustic membrane in a second direction different from the first direction and/or to move the acoustic membrane by a second distance different from the first distance after applying the first signal to the coil, wherein the first signal and the second signal are direct current (DC) voltages having different levels, respectively, and/or the first signal and the second signal are signals have different waveforms, respectively.

22. The method of claim 21, wherein the first signal and the second signal are DC voltages having different levels, respectively,
wherein the applying of the first signal to the coil includes arranging the acoustic membrane on a first location by applying the first signal to the coil, and
wherein the applying of the second signal to the coil includes arranging the acoustic membrane on a second location by applying the second signal to the coil.

23. The method of claim 22, further comprising:
determining the first signal and/or the second signal sequentially depending on a profile defining a sequential location of the acoustic membrane over time.

24. The method of claim 21, wherein the first signal and the second signal are signals having different waveforms, respectively, and each of the first signal and the second signal includes at least one of a rectangular waveform, a triangular waveform, a sawtooth waveform, or a pulse waveform.

25. The method of claim 21, further comprising:
determining whether there is liquid in the acoustic cavity based on data about an environment inside and outside the electronic device, the data being obtained by at least one sensor of the electronic device, and
applying the first signal to the coil via the amplifier and/or the second signal to the coil via the amplifier based on a determination that there is the liquid in the acoustic cavity.

26. A method of controlling an electronic device for forcing out liquid in an acoustic cavity in the electronic device, the electronic device including an acoustic module comprising a coil and an acoustic membrane and a housing, in which the acoustic module is disposed, the method comprising:
applying a first signal to the coil via an amplifier to move the acoustic membrane in a first direction by a first distance; and
applying a second signal to the coil via the amplifier to move the acoustic membrane in a second direction different from the first direction and/or to move the acoustic membrane by a second distance different from the first distance after applying the first signal to the coil,
wherein the applying of the first signal to the coil includes applying the first signal of a first frequency to the coil, and
wherein the applying of the second signal to the coil includes applying the second signal of the first frequency together with the first signal to the coil after a specified time, the second signal being different in phase from the first signal.

27. The method of claim 26, wherein the first signal and the second signal are signals having different waveforms, respectively.

28. The method of claim 26, further comprising:
determining whether there is liquid in the acoustic cavity based on data about an environment inside and outside the electronic device, the data being obtained by at least one sensor of the electronic device, and
applying the first signal to the coil via the amplifier and/or the second signal to the coil via the amplifier based on a determination that there is the liquid in the acoustic cavity.

* * * * *